(12) United States Patent
Hu

(10) Patent No.: US 6,483,538 B2
(45) Date of Patent: Nov. 19, 2002

(54) HIGH PRECISION SUB-PIXEL SPATIAL ALIGNMENT OF DIGITAL IMAGES

(75) Inventor: Shane Ching-Feng Hu, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/186,761

(22) Filed: Nov. 5, 1998

(65) Prior Publication Data

US 2002/0097342 A1 Jul. 25, 2002

(51) Int. Cl.$^7$ ................................................ H04N 17/00
(52) U.S. Cl. ........................ 348/180; 348/189; 348/190
(58) Field of Search ................................. 348/180, 182, 348/183, 189, 190; 375/10, 142, 151, 368; 382/293, 294, 295, 279; H04N 17/00, 17/02

(56) References Cited

U.S. PATENT DOCUMENTS

| | | | | |
|---|---|---|---|---|
| 4,672,275 A | * | 6/1987 | Ando ........................... | 348/189 |
| 5,091,773 A | * | 2/1992 | Fouche et al. ............... | 348/189 |
| 5,319,459 A | * | 6/1994 | Mochizuki et al. .......... | 348/189 |
| 5,392,314 A | * | 2/1995 | Wolf ............................ | 375/224 |
| 5,550,937 A | * | 8/1996 | Bell et al. .................... | 382/293 |
| 5,818,520 A | * | 10/1998 | Janko et al. ................. | 348/189 |
| 5,959,414 A | * | 9/1999 | Yoshida et al. .............. | 348/189 |
| 6,020,919 A | * | 2/2000 | Fujii et al. ................... | 348/189 |

FOREIGN PATENT DOCUMENTS

| EP | 0366165 | 5/1990 |
|---|---|---|

OTHER PUBLICATIONS

D.H. Hristov and B.G. Fallone, "A Grey–Level Image Alignment Algorithm for Registration of Portal Images and Digitally Reconstructed Radiographs", Medical Physics, American Institute of Physics, New York, vol. 23, No. 1, Jan. 1996, pp. 75–84.

Scott C. Douglas, "A Frequency–Domain Subpixel Position Estimation Algorithm for Overlay Measurement", Proceedings of SPIE, Integrated Circuit Metrology, Inspection, and Process Control VII, San Jose, CA, Mar. 2–4, 1993, vol. 1926, pp. 402–411.

"Video–Rate Image Correlation Processor" by J.J. Pearson, D.C. Hines, Jr., S. Golosman & C.D. Kuglin, SPIE vol. 119 Application of Digital Image Processing (IOCC 1977), pp. 197–205.

"Computer Image Processing and Recognition" by Ernest L. Hall The University of Tennessee, Department of Electrical Engineering 1979 Academic Press.

\* cited by examiner

*Primary Examiner*—John Miller
*Assistant Examiner*—Trang U. Tran
(74) *Attorney, Agent, or Firm*—Francis I. Gray

(57) ABSTRACT

A high precision sub-pixel spatial alignment of digital images, one from a reference video signal and another from a corresponding test video signal, uses an iterative process and incorporates spatial resampling along with basic correlation and estimation of fractional pixel shift. The corresponding images from the reference and test video signals are captured and a test block is overlaid on them at the same locations to include texture from the images. FFTs are performed within the test block in each image, and the FFTs are cross-correlated to develop a peak value representing a shift position between the images. A curve is fitted to the peak and neighboring values to find the nearest integer pixel shift position. The test block is shifted in the test image by the integer pixel shift position, and the FFT in the test image is repeated and correlated with the FFT from the reference image. The curve fitting is repeated to obtain a fractional pixel shift position value that is combined with the integer pixel shift value to update the test block position again in the test image. The steps are repeated until an end condition is achieved, at which point the value of the pixel shift position for the test block in the test image relative to the reference image is used to align the two images with high precision sub-pixel accuracy.

2 Claims, 2 Drawing Sheets

HIGH PRECISION SUB-PIXEL SPATIAL ALIGNMENT OF DIGITAL IMAGES

BACKGROUND OF THE INVENTION

The present invention relates to the matching of digital images, and more particularly to high precision sub-pixel spatial alignment of digital images.

Accurate spatial alignment of digital images is of fundamental importance to many applications. One such application is the determination of picture quality using an instrument, such as the PQA200 Picture Quality Analyzer manufactured by Tektronix, Inc. of Beaverton Oreg., USA, where images from a reference video signal are compared with corresponding images from a test video signal that is a processed version of the reference video signal. The better the spatial alignment between a reference image and a corresponding test image, the more accurate the determination of the amount of degradation of the test video signal due to the processing.

At pages 480–484 of *Computer Image Processing and Recognition* (1979) published by Academic Press, Ernest L. Hall describes a basic correlator method for template matching, which may be used for image alignment. Likewise J. J. Pearson et al in an article entitled *Video-Rate Image Correlation Processor* (IOCC 1997) published in SPIE Vol. 119 *Application of Digital Image Processing*, pages 197–205, describe a variant of the basic correlator method that uses phase information. For digital images with integer pixel shifts these correlation methods may be very accurate. However for a broader class of shifts, which involves both integer and fractional pixel shifts, the precision of the sub-pixel alignment becomes a very serious matter. Pearson et al describe a method for estimating the sub-pixel shifts by quadratic interpolation using the correlation values in the neighborhood of a peak. However, since the quadratic interpolation function does not necessarily match the true image shifting function, the accuracy obtained by the quadratic interpolation is limited.

What is desired is a high precision sub-pixel spatial alignment of digital images.

BRIEF SUMMARY OF THE INVENTION

Accordingly the present invention provides for high precision sub-pixel spatial alignment of digital images using an iteration method and spatial resampling. A high precision sub-pixel spatial alignment of digital images, one from a reference video signal and another from a corresponding test video signal, uses an iterative process and incorporates spatial resampling along with basic correlation and estimation of fractional pixel shift. The corresponding images from the reference and test video signals are captured and a test block is overlaid on them at the same locations to include texture from the images. FFTs are performed within the test block in each image, and the FFTs are cross-correlated to develop a peak value representing a shift position between the images. A curve is fitted to the peak and neighboring values to find the nearest integer pixel shift position. The test block is shifted in the test image by the integer pixel shift position, and the FFT in the test image is repeated and correlated with the FFT from the reference image. The curve fitting is repeated to obtain a fractional pixel shift position value that is combined with the integer pixel shift value to update the test block position again in the test image. The steps are repeated until an end condition is achieved, at which point the value of the pixel shift position for the test block in the test image relative to the reference image is used to align the two images with high precision sub-pixel accuracy.

The objects, advantages and other novel features of the present invention are apparent from the following detailed description when read in conjunction with the appended claims and attached drawing.

DETAILED DESCRIPTION OF THE INVENTION

Figure 1:
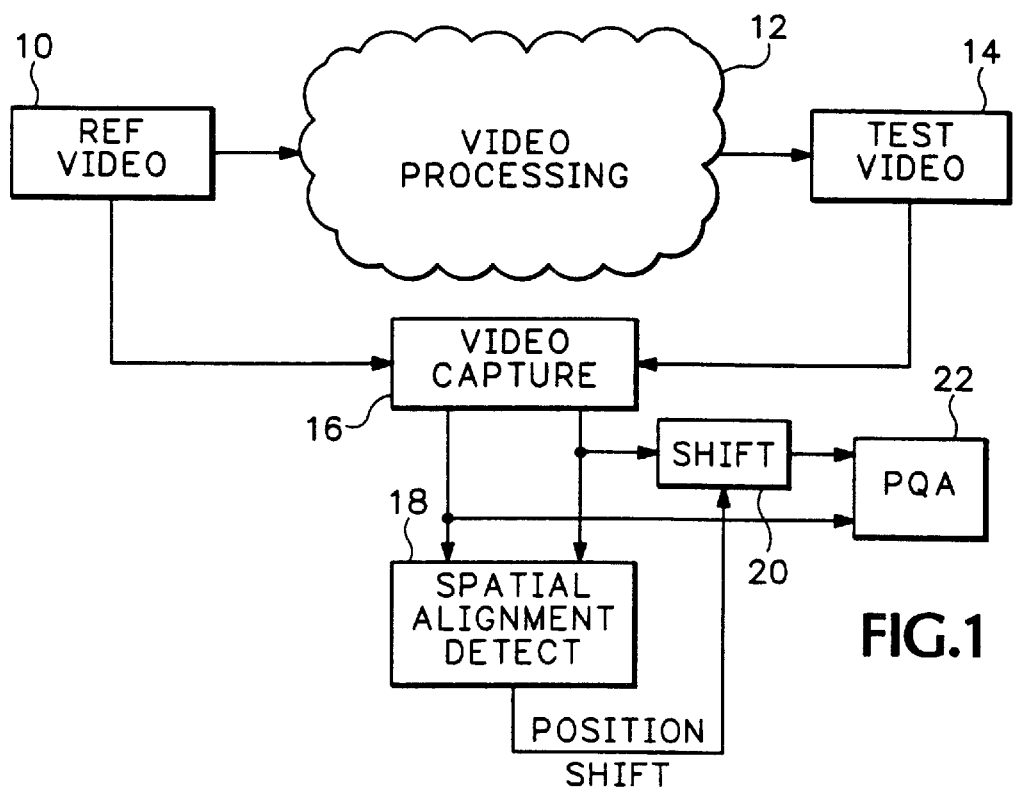
FIG. 1 is a block diagram view of a system for high precision sub-pixel spatial alignment of digital images according to the present invention.

Referring now to FIG. 1 an original, reference video signal from a source 10 is input to a video processing network 12. The video processing network 12 may include one or more compression/decompression passes. The output from the video processing network 12 is input to a decoder or similar device 14 to provide a source of a test video signal. The reference and test video signals are input to a video capture module 16 that captures corresponding images or frames from the two video signals. The corresponding image pairs from the video capture module 16 are input to a high precision sub-pixel spatial alignment detect module 18 to determine a position shift between the images of the reference video signal and the images of the test video signal. The position shift from the spatial alignment detect module 18 is input to a position shift module 20, which may be either in the reference or test signal path, to precisely align the image pairs with sub-pixel accuracy from the video capture module 16 for further processing, such as by a picture quality analyzer 22.

Figure 2:
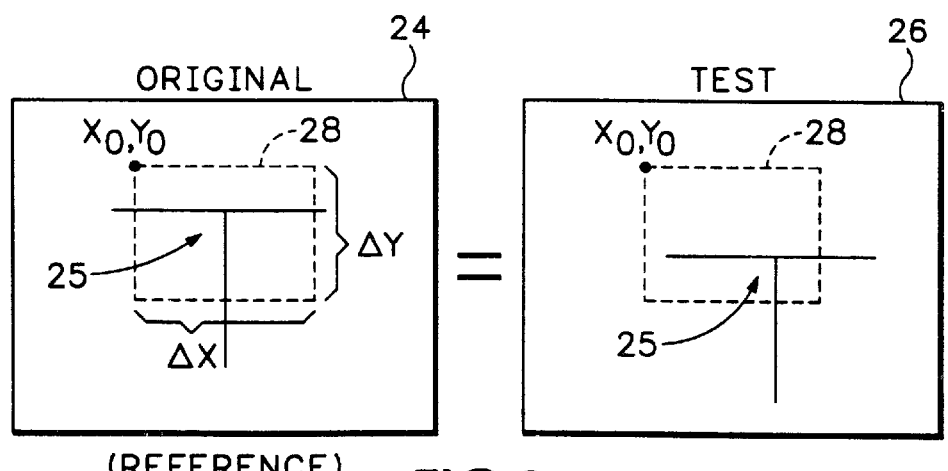
FIG. 2 is an illustrative view of a comparison of an image from a reference video signal and an image from a corresponding test video signal to be spatially aligned with high precision sub-pixel accuracy according to the present invention.

In FIG. 2 the reference and test images 24, 26 are shown having some texture 25, i.e., not a matte image. As shown in the test image after processing the texture 25 has been shifted horizontally and/or vertically. An arbitrary test region or block 28 is formed, shown in this example as a rectangle, having a reference point Xo, Yo and is overlaid on both the reference and test images. For a rectangle as shown the reference point and horizontal and vertical extents ΔX, ΔY define the test region or block 28. The test region 28 is located where there is substantial texture 25 in the images.

Figure 3:
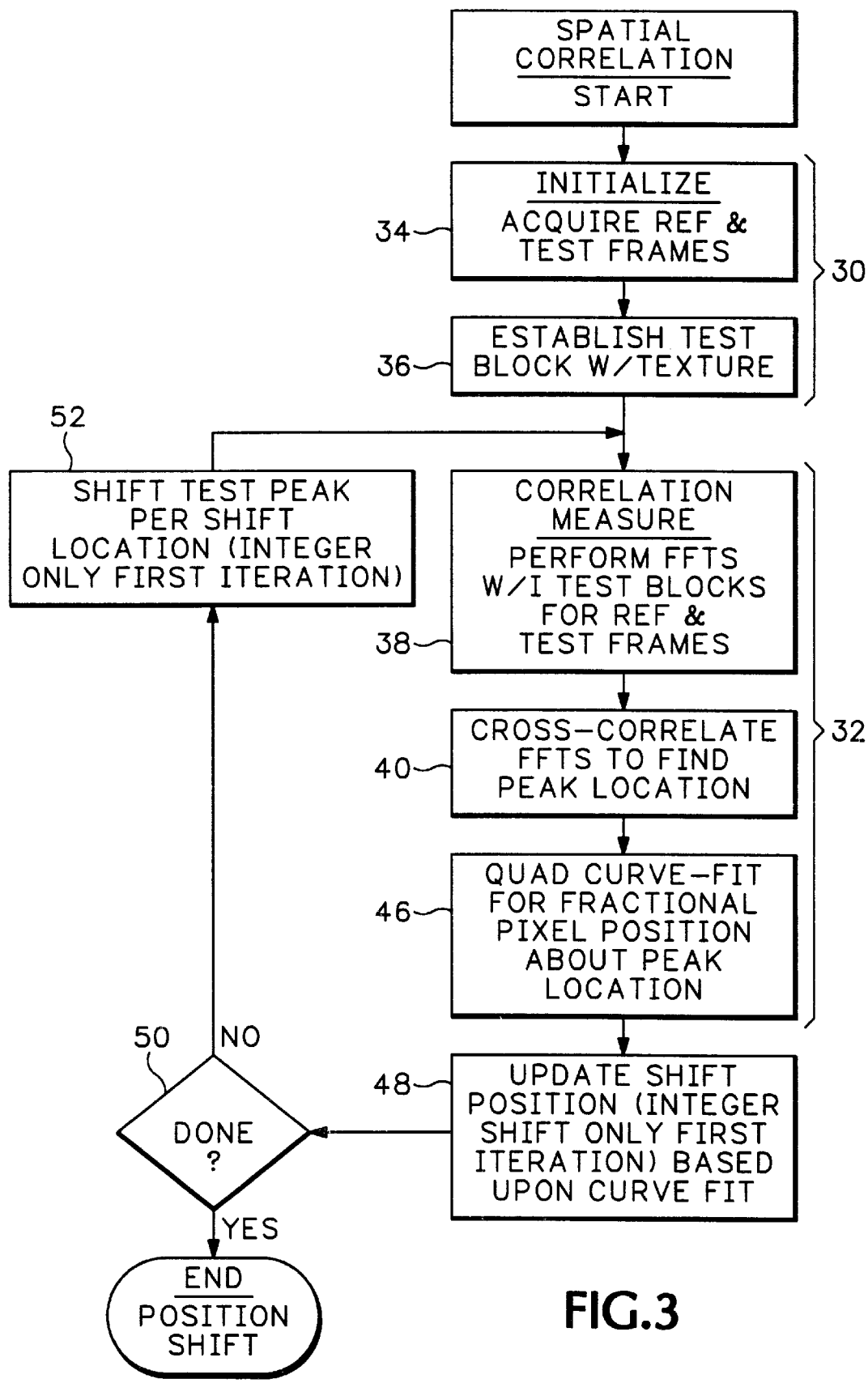
FIG. 3 is a flow diagram view of a high precision sub-pixel spatial alignment algorithm according to the present invention.

A high precision sub-pixel spatial alignment algorithm is shown in FIG. 3. An initialization module 30 provides the corresponding reference and test images together with a test block to a correlation measurement module 32. The first step 34 in the initialization module 30 controls the video capture module 16 to capture corresponding reference and test images or frames from the reference and test video signals. The second step 36 establishes a test block for overlaying on the respective images in an area that has significant texture 25. The first step 38 of the correlation measurement module 32 applies a fast Fourier transform (FFT) to the pixels of the images that lie within the test region. A cross-correlation step 40 is then performed in the FFT domain.

$$FFT(corr)=FFT(ref)*FFT(tst)$$

Figure 4:
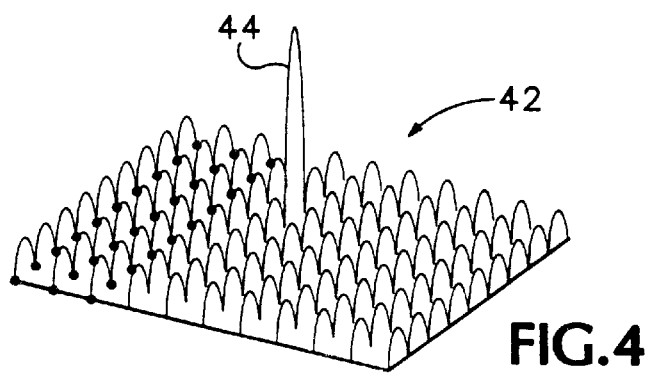
FIG. 4 is an illustrative view of a cross-correlation surface showing a peak location for the high precision sub-pixel spatial alignment algorithm according to the present invention.

$FFT^{-1}(corr)$ produces correlation coefficients for every shift point within the test region, which may be represented in the form of a surface 42 as shown in FIG. 4. The position of a peak 44 in the surface 42 indicates the amount of shift in position between the reference and test images. A curve-fit step 46 provides a nearest integer pixel shift position for the peak 44 based upon the coefficients for the peak position and the positions up, down, left and right from the peak position. The pixel shift position from the correlation measure module 32 is input to an update shift position step 48. For the first iteration only the nearest integer pixel shift position is used.

A testing step 50 checks the amount of position shift determined from the update shift position step 48 and the number of iterations against specified parameters to determine whether the spatial alignment algorithm is done. If the number of iterations is equal to the specified number, or the amount of update is less than a specified noise value, then the shift position value from the update step 48 is provided as an output pixel shift position and the algorithm ends. Otherwise a shift test block step 52 shifts the test region in the test image by the value from the update position step 48 so that the reference point is shifted to be $X+X_A$, $Y+Y_A$, where $X_A$ and $Y_A$ are the integer pixel shift position values. With the new position of the test region or block, the correlation module 32 is applied again to obtain a fractional pixel shift value in X and Y. In the FFT step 38 only the test image is processed after the initial iteration. The FFT for the reference image does not change. The fractional pixel shift value is used to update the shift position in the update step 48 so that the shift position becomes $Xo+X_A+X_f$, $Yo+Y_A+Y_f$. It has been found that for most practical applications two fractional pixel shift position iterations produce satisfactory results. The final shift position value output from the spatial alignment detect module 18 is then used to spatially align the test and reference images as indicated above.

Thus the present invention provides high precision sub-pixel spatial alignment of digital images by using an iterative process to cross-correlate FFTs for a test block from each image in order to find a peak representative of a shift position between the images, then by fitting a curve to the correlation coefficients to determine a nearest integer pixel shift position, updating the position of the test block in the test image and repeating until a specified number of iterations occurs or a change in fractional pixel shift position is less than a noise value.

What is claimed is:

1. A method of high precision sub-pixel spatial alignment of digital images comprising the steps of:

capturing a reference image from a reference video signal as one of the digital images and a corresponding test image from a test video signal as another of the digital images, where the test video signal represents the reference video signal after processing;

overlaying an arbitrary test block on the reference and test images at corresponding locations that include texture;

performing a fast Fourier transform for the portions of each image that lie within the test block to produce a reference FFT and a test FFT;

cross-correlating the reference and test FFTs to produce a correlation surface having a peak correlation value, the position of the peak correlation value on the correlation surface being representative of a shift position between the reference and test images;

fitting a curve to the peak and neighboring correlation values to determine an integer pixel shift position;

updating the position of the test block overlaying the test image by the integer pixel shift position; and repeating the performing step for the test image, the correlating step for finding fractional pixel shift positions, and the updating step by adding the fractional pixel shift positions to the integer pixel shift position until an end condition is achieved, the final position of the test block in the test image from the updating step relative to the initial position of the test block in the test image providing the high precision sub-pixel shift alignment between the reference and test images.

2. A method of high precision spatial alignment between a reference digital image and a processed version of the reference digital image comprising the steps of:

cross-correlating in the frequency domain a common test block from each of the digital images, the common test block being positioned at the same location initially in both digital images, to produce a correlation surface having a peak correlation value at a particular position within the common test block;

updating the location of the common test block in one of the digital images relative to the initial location as a function of the particular position to initially provide integer pixel precision; and iterating the cross-correlating and updating steps to provide greater than integer pixel precision until a specified end condition is achieved, the final location of the common test block in the one digital image relative to the initial location representing a spatial offset for aligning one digital image to the other with sub-pixel precision.

\* \* \* \* \*